(12) United States Patent
Yukl

(10) Patent No.: US 6,927,691 B2
(45) Date of Patent: Aug. 9, 2005

(54) DIELECTRIC PERSONNEL SCANNING

(75) Inventor: Tex Yukl, Juliaetta, ID (US)

(73) Assignee: Spatial Dynamics, Ltd., Juliaetta, ID (US)

( * ) Notice: Subject to any disclaimer, the term of this patent is extended or adjusted under 35 U.S.C. 154(b) by 232 days.

(21) Appl. No.: 10/304,388

(22) Filed: Nov. 25, 2002

(65) Prior Publication Data

US 2003/0178034 A1 Sep. 25, 2003

Related U.S. Application Data

(60) Provisional application No. 60/367,961, filed on Mar. 25, 2002.

(51) Int. Cl.$^7$ ............................................. G08B 13/14
(52) U.S. Cl. ............................... 340/568.1; 340/573.1; 340/540; 340/691.6
(58) Field of Search ............................... 340/568.1, 540, 340/573.1, 691.6; 342/22; 250/358.1, 393; 128/922, 920, 923

(56) References Cited

U.S. PATENT DOCUMENTS

| | | | |
|---|---|---|---|
| 4,234,844 A | | 11/1980 | Yukl |
| 4,318,108 A | | 3/1982 | Yukl |
| 4,532,939 A | | 8/1985 | Yukl |
| 4,805,627 A | * | 2/1989 | Klingenbeck et al. ...... 600/425 |
| 4,878,059 A | | 10/1989 | Yukl |
| 4,912,982 A | | 4/1990 | Yukl |
| 4,947,848 A | | 8/1990 | Yukl |
| 4,949,094 A | | 8/1990 | Yukl |
| 4,975,968 A | | 12/1990 | Yukl |
| 5,083,089 A | | 1/1992 | Yukl |
| 5,227,800 A | * | 7/1993 | Huguenin et al. .......... 342/179 |
| 6,057,761 A | | 5/2000 | Yukl |
| 6,061,589 A | * | 5/2000 | Bridges et al. ............. 600/430 |
| 6,480,141 B1 | * | 11/2002 | Toth et al. .................... 342/22 |
| 6,507,309 B2 | * | 1/2003 | McMakin et al. ............ 342/22 |

* cited by examiner

Primary Examiner—Daniel Wu
Assistant Examiner—Sihong Huang
(74) Attorney, Agent, or Firm—Jon M. Dickinson, PC; Robert D. Varitz, PC

(57) ABSTRACT

A system and method for the dielectric scanning of a human subject to detect anomalies relative to expected normal physiology as an indication, among other things, of the possible presence of a weapon, contraband, or of a confirmed difference in personal identity. Persons expeditiously can enter a double-open-sided, ninety-degree counter-rotative scanning zone in the system, alternating from two orthogonally positional entry lines. Scanning occurs in two orthogonal phases of non-relative-motion interrogative microwave illumination to detect sequential, opposite-side-quadrant, dielectric physiologic anatomical signatures which are assessed by computer comparing them to pre-established physiologic-signature tables. Persons entering the scanning zone, leave along a quadrature-related exit path.

8 Claims, 2 Drawing Sheets

POLARITY PATTERN
$P_1 = \downarrow$   $P_2 = \leftarrow$

DIELECTRIC PERSONNEL SCANNING

CROSS REFERENCE TO RELATED APPLICATION

This application claims priority to U.S. Provisional Patent Application Ser. No. 60/367,961, filed Mar. 25, 2002 entitled "Dielectric Personnel Scanning". The entire disclosure content of that provisional patent application is hereby incorporated herein by reference.

BACKGROUND AND SUMMARY OF THE INVENTION

The present invention relates to a system, apparatus, and methodology involving dielectric microwave scanning, or illuminating, screening, of a human subject, and in particular to such scanning which is done for the purpose of detecting, in relation to baseline physiologic response data, and according to defined screening criteria, notable differences, or anomalies, in relation to a given individual's "dielectric signature".

While there are many applications in which the system, apparatus and methodology of this invention find substantial practical utility, two specific such fields of activity are particularly noted herein, and one of these is employed as a principal model for discussing and explaining the structure and operation of this invention. These two areas include (a) security detection, or scanning, at locations such as airports for the purpose of detecting weapons, contraband, etc., and (b) authorized access control for personnel in sensitive areas, for example, in relation to research and development areas within a business. Many other useful applications will come to mind to those generally skilled in the art.

The present invention departs from, and offers certain improvements, over, a predecessor system and methodology which are fully illustrated and described in U.S. Pat. No. 6,057,761, issued May 2, 2000, for "Security System and Method". These improvements, which exist in certain areas involving both mechanical and electrical aspects of the scanning process and structure per se, result in the present invention having certain preferential utility in particular applications, such as in applications involving airport-security screening areas where a very high throughput of people needs to be accommodated. In terms of how scanned data is ultimately read (monitored and evaluated) to detect dielectric anomalies that are important to detect, substantially the same technology (for that area of this subject matter) which is described in the just-mentioned '761 patent is also employed, for the most part, in the improved invention version which is disclosed in this document.

In general terms, and with specific reference to the improvement characteristics of the present invention just generally referred to, whereas in the '761 system and methodology scanning/screening takes place with a person standing inside of a substantially fully encircling enclosure defining an interrogation region, which enclosure rotates during actual microwave-illumination scanning, in other words with relative motion taking place between specific microwave scanning instrumentalities and a person, according to the present invention, there is substantially no relative motion that occurs between a subject and the scanning instrumentalities during microwave scanning activity.

Further, whereas in the '761 system the geometry there is such that persons in a line awaiting scanning generally feed from a single lineup of people, the present invention promotes a unique quadrature lineup of two lines of people, from which, alternately, people from the head of each line enter, one after another, a relatively open (not fully encircling) scanning-zone structure, and depart along an angled, quadrature path with respect to the direction in which they entered. Each scanning operation (subject scanning procedure) involves a short (in time) quadrature rotation, for repositioning purposes, of the dielectric scanning instrumentalities (or devices) which actually perform the electronic part of the scanning operation. With respect to the scanning of a single individual, one such quadrature rotation occurs between two stopped and fixed positions, wherein electronic scanning data is captured in a non-relative-motion sense (as was mentioned just above), with the scanning structure then being quadrature re-positioned, so-to-speak, to receive and accommodate the subject at the head of the other line which is oriented in quadrature relative to the line from which the last-scanned subject came. This operation will become clearly evident from a review of several herein-included drawing figures to be discussed shortly.

Additionally, whereas in the '761 approach to scanning, arrays of independent transmitter and receiver antenna units function to direct (transmit) electromagnetic microwave energy, and to receive returned energy, respectively, in the present invention transmission and reception are performed simultaneously by arrays of singular, co-axial transmitter/receiver antenna units that are arranged in rows and columns carried by tile-like structures, as will be explained shortly.

Much of the important background and operational setting for the present invention is well presented in the '761 patent disclosure, and accordingly, the readers of this document are encouraged to review the text of the '761 patent, which patent is hereby expressly incorporated herein by reference.

Also lying in the historical background of the present invention are several other issued U.S. Patents whose contents are entirely herein also incorporated by reference. These patents include: U.S. Pat. No. : 4,234,844, issued Nov. 18, 1980, for "Electromagnetic Noncontacting Measuring Apparatus"; U.S. Pat. No. 4,318,108, issued Mar. 2, 1982, for "Bidirectionally Focusing Antenna"; U.S. Pat. No. 4,878,059, issued Oct. 31, 1989, for "Farfield/Nearfield Transmission/Reception Antenna"; U.S. Pat. No. 4,947,848, issued Aug. 14, 1990, for "Dielectric-Constant Change Monitoring"; U.S. Pat. No. 4,949,094, issued Aug. 14, 1990, for "Nearfield/Farfield Antenna With Parasitic Array"; U.S. Pat. No. 4,975,968, issued Dec. 4, 1990, for "Timed Dielectrometry Surveillance Method and Apparatus"

Regarding the dielectric scanning process which is implemented by the present invention, as a general statement regarding the relevant physics, all materials have what is known as a dielectric constant which is associated with their physical, electrical (electromagnetic and electrostatic) properties. As a consequence, when exposed to different wavelengths and frequencies of microwave radiation, each material produces a reflection reaction, or response, to that radiation, which response, in nature, is uniquely related, among other things, to the particular material's respective dielectric constant. By subjecting a material to controlled, transmitted, microwave energy, it is possible to interpret a material's "response" thereto in terms of its dielectric constant. The term "dielectric signature" is employed herein to refer to this phenomenon.

Where plural, different characters of materials are closely united in a selected volume of space, microwave radiation employed to observe and detect the "dielectric signature" of that "space" will elicit a response which is based upon an averaging phenomenon in relation to the respective dielectric-constant contributions which are made in that space by the respective, different, individual material components. This averaging condition plays an important role in the effectiveness of the present invention, and this role is one which the reader will find fully described and discussed in the above-mentioned '761 patent.

With reliance on this role, and now briefly stated, the system and methodology of this invention are designed to direct microwave radiation into the human anatomy (at completely innocuous levels regarding any damage threat to tissue, body fluids, or bone) in such a fashion that it will effectively engage a volumetric space within the body wherein there are at least two, different (boundaried) anatomical materials, each characterized by a different dielectric constant, which materials co-contribute, in the above-mentioned "averaging" manner, to the "effective", apparent "uniform" (or nominal homogeneous) dielectric constituent of the whole space. As is explained in the '761 patent, by so designing the invention to engage the mentioned at-least-two-material volumetric space inside the anatomy, the likelihood that a weapon, or an article of contraband, will, by the nature of its own dielectric constant, and/or its specific configuration and shape, and/or its precise location and/or disposition relative to the human body, will "fool" the invention by masquerading as a normal and expectable anatomical constituent, is just about nil. Preferably the "penetration depth" of this internal anatomical space is about 2½-wavelengths of the system operating frequency as measured mechanically in material having the mentioned "normal" dielectric constant.

If and when a foreign object, such as a weapon, or a contraband object, is borne by a person, for example closely against the outside the body, the presence of this object will, therefore, and does, change the average dielectric constant of the material content of the volume of space (anatomy, of course, included) which is occupied, in a very non-normal-anatomical, and detectable, manner, by the mentioned microwave radiation. Definitively, the presence of such non-expected (non-anatomical physiologic) material significantly changes the average value of the effective, average and apparent, uniform, spatial dielectric constant, in accordance with the averaging phenomena just mentioned above, and creates a situation wherein a distinctly different-than-expected dielectric signature appears as a responsive result of microwave scanning transmission in accordance with the invention.

Further describing important distinctions that exist between prior art conventional practice, and practice performed in accordance with the present invention, whereas conventional scanning systems are designed to look for and identify a rather large number of specific objects and materials, the approach taken according to the present invention is based upon examining human physiology for physiologic irregularities/abnormalities which are not expected to be part of the usual human, physiologic, dielectric signature (within a range of course) that essentially all people's bodies are expected to produce. As a consequence of this quite different approach for scanning, the system and methodology of this invention are significantly more efficient, and quicker, in terms of identifying weaponry, contraband, etc. problem situations. Any out-of-norm physiologic signature which is detected produces an alarm state, which state can be employed to signal the need to security people to take a closer look at what the particular, just-scanned subject involved might have on his or her person.

According to a preferred embodiment and manner of practicing the invention, a kiosk-like unit is provided into which a party to be scanned steps through an open, subject entry-way which is defined by a pair of spaced opposing upright panels, each of which carries an array of combined, coaxial microwave transmitters and receivers. These two panels effectively define an always open and exposed through-passage through the region between them, which region is referred to herein as a scanning zone, or chamber. These panels also define what is referred to herein as a panel-orientation-determined path for the passage of a person through the scanning zone. A complete scan of a human subject takes place in two stages, with, in one stage, these panels being located on one set of opposite sides of the body, such as on the left and right sides of a person, and in the other stage, the panels being disposed in a quadrature-related condition (having been rotated ninety-degrees) to perform a second scan which is taken along the two orthogonally related body sides, such as the front and rear sides of the person. Between these two scan orientations, the panels are rotated (as was just noted) through a ninety-degree arc, and in each of the two scanning positions, there is essentially no relative motion which takes place between the panels and the subject standing between them.

A unique processing feature of the present invention, with respect to the handling and scanning of large numbers of people such as must be handled at airport security locations, is that the system of the invention allows for the creation, essentially, of two, generally orthogonally related lines of people waiting to be scanned, with successive people who are scanned entering the scanning zone, one after another, and alternately, from the heads of each of the two orthogonally related lines. A person to be scanned initially faces the scanning zone with a clear (see-through) view into (and through) that zone between the two panels. That person steps into the zone between the two panels, whereupon certain initial data are taken, such as weight. Feet and shoes are also scanned at this point in time, as will be further explained.

With the person in place in the scanning zone, and disposed relatively stationary within that zone, the first scanning phase takes place to examine, sequentially, the laterally opposite sides of that person. When that scan is completed, and it is completed in a very short period of time, typically about 8-milliseconds, structure supporting the two panels rotates these panels through an arc of ninety-degrees, and stops the panels in the second scanning position relative to that subject, wherein the front and rear sides of the person are similarly scanned sequentially under a circumstance similar to that just described where the panels, and the subject between them, are again relatively fixed in positions with respect to one another. Subject height data, which is employed as one of the factors useful in selecting the appropriate dielectric-signature profile for evaluating scan data regarding each scanned person, is obtained from the results of this first scanning phase. Handily, this data is readily obtainable by noting which of the uppermost, combined, transmitter/receiver units that are employed during this phase do not create and receive "dielectric response".

The second scanning operation completes the scan process for the single subject now being discussed, whereupon that subject turns a corner to the right or to the left (this is illustrated in the drawings) depending upon which is considered to be the exit side from the scanning zone, and exits through the now-rotated, open (see-through) space between the two panels. The panels are now positioned orthogonally with respect to the positions that they held when the first person just described was to be scanned, and the lead person in the orthogonally related other line of people now enters the scanning zone from the orthogonal location of that other line. Scanning of this next person takes place in much the same fashion just above described, except for the fact that, when the panel structure rotates through an arc of about ninety-degrees to perform the second scan of this "next" person, it effectively counter-rotates back to the position which it initially held in preparation for the previously explained scanning of the first person mentioned above. Scanning data is appropriately computer acquired from all scanning phases (two per person).

From the scanning data which is gathered with respect to each scanned person, that data is compared to a "map" or "schedule" of appropriate, physiologic, dielectric data relating to someone with a body type, height and weight similar to that of the person specifically being scanned, and any notable, dielectric-signature-related abnormalities cause an alarm state to go be created which causes security people, for example, to call the particular subject aside for further and more focused scanning inspection. No photographic imagery is developed from any scanning data. Rather, one of the output qualities of scanned data includes the presentation, on a simple wire-form human anatomy shape, of one or more highlighted general anatomic areas that show where a detected abnormality resides. This presentation of data is easily readable and assessable with little personnel-interpretive activity required. Output data may also be presented in a somewhat grid-like, or checkerboard-like, field of light and dark patches whose lightnesses and darknesses are interpretable to indicate the presence of a detected dielectric, non-physiologic abnormality.

Other features and unique advantages that are offered by the present invention will become more fully apparent as the description which now follows is read in conjunction with the accompanying drawings.

DETAILED DESCRIPTION OF THE INVENTION

Figure 1:
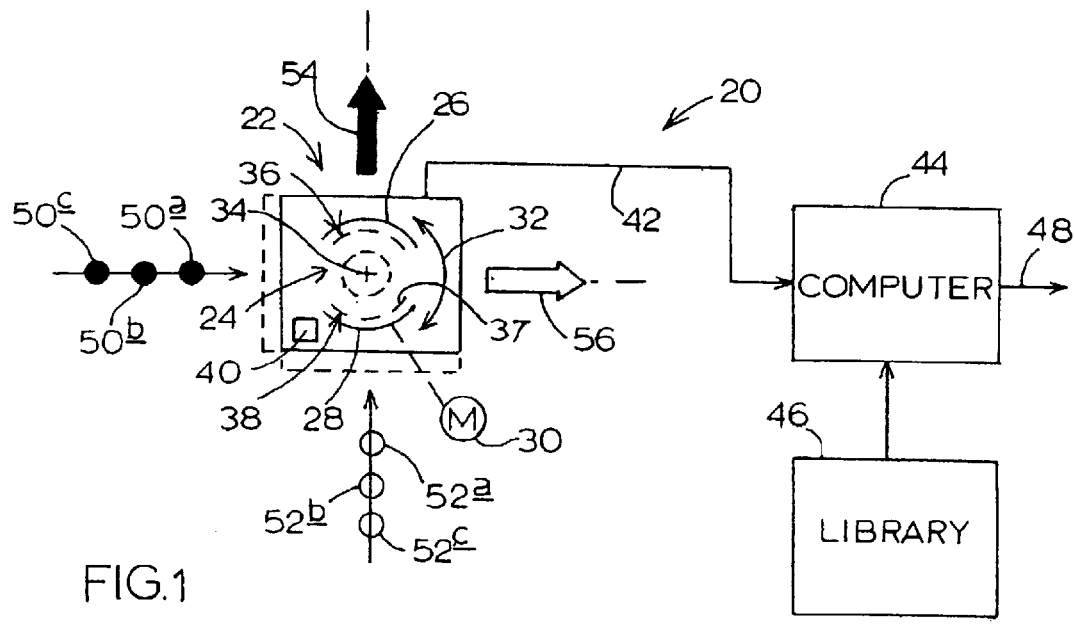
FIG. 1 is a simplified block/schematic diagram of a physiologic, dielectric scanning system which is constructed in accordance with a preferred embodiment of the present invention.
Figure 2:
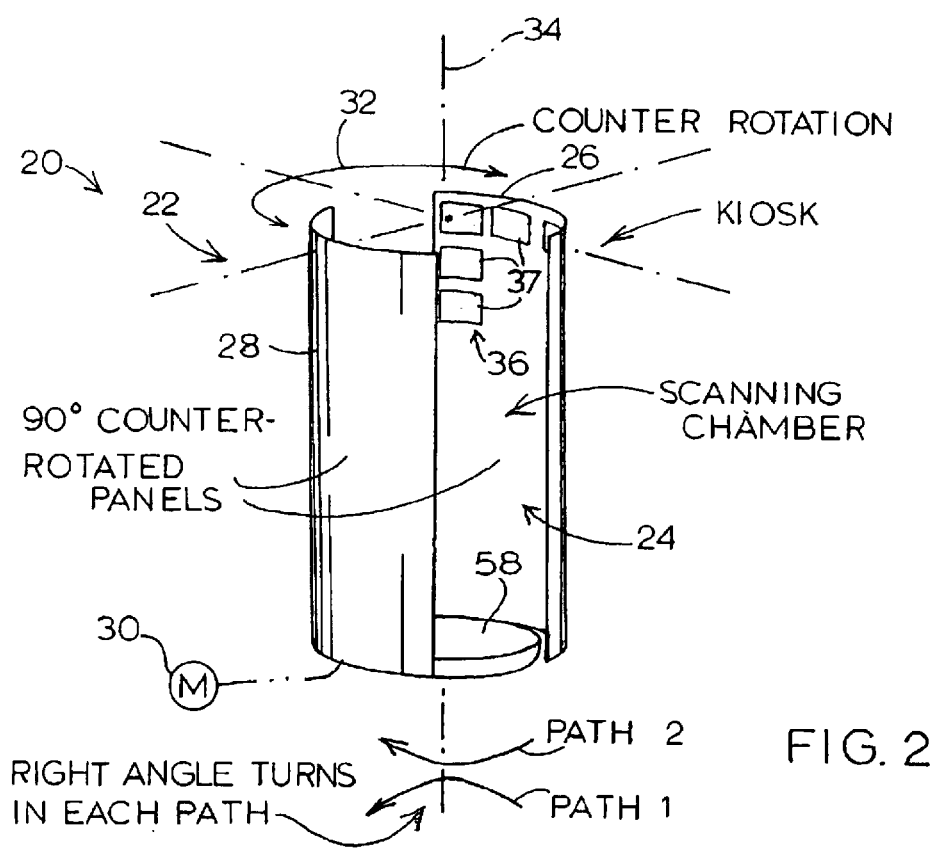
FIG. 2 is a simplified and stylized isometric view of a pair of ninety-degree counter-rotative, microwave, transmitters/receiver-unit panels which define opposite sides of a kiosk-like scanning zone, or chamber, formed in accordance with the present invention.

Turning attention now to the drawings, and referring first of all to FIGS. 1 and 2, indicated generally at 20 is a dielectric, physiologic scanning/screening system built in accordance with the present invention. Included in system 20 is a special kiosk-like unit 22 which includes what is referred to herein as a scanning, or screening, zone (or chamber) 24 that is specifically defined as a space, between a pair of upright, curvilinear panels 26, 28. The panels (also referred to herein as "scanning" panels) are appropriately mounted for orthogonal (ninety-degrees only), reversible counter-rotation under the influence of a drive motor 30, back and forth (as indicated by double-ended, curved arrow 32) about an upright axis 34 which extends upwardly centrally through the scanning zone. Axis 34 extends substantially normal to the plane of FIG. 1.

As will be more fully described shortly, each of panels 26, 28 carries, in three vertical columns extending from top to bottom along the panel, plural arrays of combined, unified, coaxial, microwave transmitter/receiver (antenna) units mounted in support structures which are formed as rectangular (square) tiles, and which are referred to herein collectively as microwave transmitter/receiver structure. One of such vertical columns of transmitter/receiver "tiles" is shown at 36 in relation to panel 26, and another such vertical column of transmitter/receiver tiles is shown at 38 in relation to panel 28. Tiles within these arrays are indicated at 37. Appropriate microwave energizing circuitry which operates to control the behaviors of the transmitter/receiver units in the transmitter/receiver tiles is represented by a block 40 that is pictured in association with the schematic showing of kiosk 22 in FIG. 1. Details of this circuitry, which can be conventional in construction, are not shown. Preferably, the operating frequency of the system, with respect to microwave activity, is 5.5-Gigaherz. As will be more fully explained shortly, this operating frequency has been found to work especially well with respect to scanning for normal physiologic dielectric signatures of the human body.

Scanning output data is furnished, as is indicated by line 42 in FIG. 1, to a suitably programmed digital computer 44 which operates in association with an appropriate library of selectable, normal, human-subject, baseline, physiologic dielectric signatures, represented by a block 46 to furnish an alarm output signal on a line 48 when any defined signature abnormality is detected. Library 46 contains appropriate schedules, maps, etc. containing per-established information regarding the selected range of human-body builds, physiologies, etc., that one wishes to profile for scanning purposes. Such information is freely designable by the user of the system and methodology of this invention. Its specific design is not a part of the present invention. Computer 44 is also referred to herein as an evaluation structure, and computer 44 and circuitry 40 are referred to collaboratively as energizing and detecting structures.

Still considering what is shown in FIG. 1, three large black dots 50a, 50b, 50c, represent three people in a line of people waiting to enter chamber 24 from the left side of kiosk 22 in FIG. 1. Similarly, three large clear dots 52a, 52b, 52c, represent three of the people in another line of people awaiting scanning and screening within zone 24, with this other line being disposed substantially in an orthogonal relationship with respect to the first-mentioned line of people. Two large arrows, including a darken arrow 54 and a clear arrow 56, represent exit paths from chamber 24 for the people, respectively, who enter chamber 24 from the lines containing representative people 50a, 50b, 50c, and 52a, 52b, 52c, respectively. In other words, each person who enters from the line at the left of FIG. 1, in a direction which is generally from the left to the right in FIG. 1, will, after full, two-phase scanning has taken place, exit chamber 24 in the direction of arrow 54. Similarly, each person who enters chamber 24 from the line pictured on the bottom side of kiosk 22 in FIG. 1 will, after completion of a scanning operation, exit the scanning zone as indicated by arrow 56. Thus, each person who enters and exits zone 24 for scanning follows generally an orthogonal path through kiosk 22. At no time during any part of a scanning procedure is a person fully enclosed in chamber 24. Two diametrically opposite sides of the chamber, between the adjacent, upright edges of panels 26, 28, are always open.

With panels 26, 28 positioned as specifically shown in FIGS. 1 and 2, these panels are arranged to allow the scanning zone to receive the first person who is standing in the line represented by blackened dots 50a, 50b, 50c. Such a person enters zone 24, through one of the two, open subject entrances to the zone, where-upon a first scanning phase is implemented under circumstances with that person, and panels 26, 28, relatively fixed in positional relationships with respect to one another. On completion of the first scanning phase for that person, then, under the control of motor 30, panels 26, 28 are rotated, for example, ninety-degrees counterclockwise so that they become positioned orthogonally relative to the positions shown for them in FIGS. 1 and 2. Following this repositioning of the panels, a second scanning phase is performed which, in the organization now being described, is a phase that scans, sequentially, the front and rear sides of the person who has entered zone 24 from the left in FIG. 1. Again, during the specific scanning operation (microwave transmission and reception), the relative positions of the person in zone 24 and panels 26, 28 is substantially fixed. In other words, scanning, according to practice of this invention, takes place under circumstances where the transmitter/receiver tiles carried by the panels are not moving in relation to the person being scanned.

With completion of this two-phase scanning operation just described, panels 26, 28 are now disposed in such a fashion that they expose zone 24 for straight-ahead entry into the zone by the first person in the line of people represented below kiosk 22 in FIG. 1 by the large clear dots. Scanning is performed for this person in much the same fashion just described, after which, that person exits the scanning zone as indicated by arrow 56.

In addition to the scanning operation performed by the transmitter/receiver structure carried by panels 26, 28, as was mentioned very briefly earlier herein, three other data-gathering operations take place with regard to everyone who is scanned in chamber 24. An appropriate weight scale or sensor is provided in a standing platform 58 (see FIG. 2) which forms the base of chamber 24. Further, additional dielectric scanning transmitters/receivers (not specifically shown) are provided underneath platform 58 for the purpose of "looking" upwardly into chamber 24 to gather scanning information regarding the foot and shoe regions in chamber 24. Additionally, the height of each person scanned in the chamber is determined, as was outlined earlier, at the conclusion of the first scanning phase associated with that person.

This additional scanning and data-gathering structure (for weight, shoes and feet) which is associated with chamber 24 does not form part of the present invention, can be completely conventional in construction, and accordingly, is not described in detail herein. The dielectric scanning transmitter/receiver structure provided beneath platform 58 is preferably constructed in much the same form that will shortly be described with respect to the unified, coaxial, transmitter/receiver units that are included in the columnar arrays of tiles, such as in previously mentioned tile 37.

Figure 5:
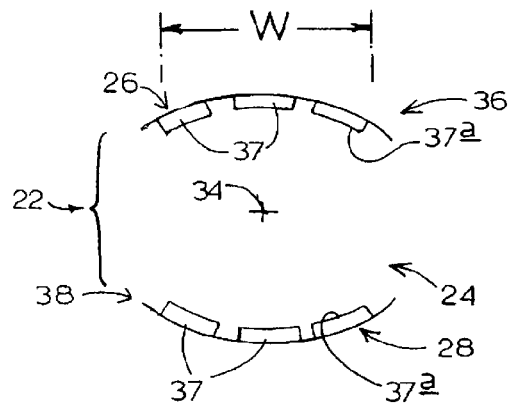
FIG. 5 is a simplified and stylized plan view looking downwardly into the scanning zone, or chamber, pictured in FIG. 2.
Figure 6:
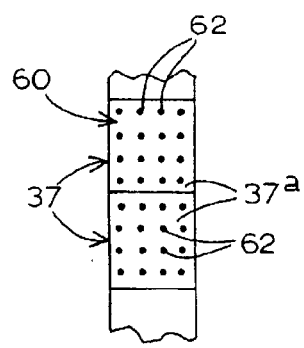
FIGS. 6 and 7 are simplified fragmentary views generally illustrating the structure of combined, plural antenna-unit, microwave transmitter/receiver structure that is carried on the "scanning" panels that define the opposite sides of the mentioned scanning zone, or chamber.
Figure 7:
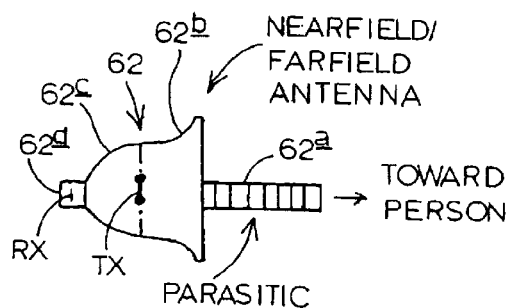

FIGS. 5–7 inclusive, illustrate more particularly the structures and arrangements of the columnar arrays of tiles, and of the individual, dual-function, microwave transmitter/receiver units which make up the tiles. Each columnar array is formed of eight vertically stacked tiles, such as previously mentioned tile 37. Each tile presents a generally square, planar face 37a to the inside of zone 24, aimed substantially directly at axis 34 (see FIG. 5), and occupying a plane which substantially parallels this axis. The edge dimension of each such face herein is about 10-inches. The vertical columns of tiles in each panel are slightly angled relative to one another, as can best be seen in FIGS. 1 and 5. The lateral width W (FIG. 5) of the three laterally deployed columns of tiles in a panel is about 30-inches.

Each tile carries a row and column arrangement 60 of sixteen, individual, dual-function, transmitter/receiver units (antennae), such as those indicated at 62. These units are arranged in a 4-by-4 configuration as illustrated. Other arrangements could of course be employed if desired. The individual transmitter/receiver units 62 have configurations of revolution, with side profiles which look like what is pictured in side elevation in FIG. 7. Each of these transmitter/receiver units is made preferably in accordance with the teachings that are presented in above-referred-to U.S. Pat. Nos. 4,878,059 and 4,949,094. The geometries of these units, with respect to organization and size, are such that they are designed to operate substantially centrally at an operating frequency herein (mentioned above) of 5.5-Gigahertz. Units 62 are oriented with their elongate, forwardly projecting parasitic element stacks (see 62a in FIG. 7) aimed toward, and along lines, generally normal to axis 34.

The panels, tiles and transmitter/receiver units are organized in such a manner that, with a person standing appropriately centrally within chamber, or zone 24, the outer extremities of the parasitic stacks reside at a distance lying within a range of about 6- to about 18-inches away from the standing subject's body.

As has been mentioned with respect to the microwave operations of the unified transmitter/receiver units 62, these units have been constructed to function substantially simultaneously as transmitters and receivers at the operating frequency which is to employed in accordance with the now-being-described, preferred embodiment of the invention. Focusing attention especially on FIG. 7 in the drawings, each transmitter/receiver unit (antenna) can be thought of as including four basic units which are: (a) an elongate cylindrical stack 62a of parasitic elements; (b) an outwardly flaring, horn-like, far-field antennae section 62b; (c) a parabolically converging nearfield antenna section 62c which joins with section 62b in a kind of flowing continuity at the region generally indicated in FIG. 7 by the short, vertical dash-dot line; and (d) a block of receiver material 62d which is formed preferably of a suitably compressed-ceramic substance having a dielectric constant of about 9.0.

Disposed within the central portions of each unit 62, generally at the location of 20 the plane which is marked in FIG. 7 by the just-mentioned dash-dot line, is a driven, ring-like transmission element marked TX in FIG. 7. Disposed within receiver block 62d is an appropriate conductive ring-like receiving element marked RX in FIG. 7. All of the components, of course, in each transmitter/receiver unit 62 are appropriately mechanically sized to operate at the mentioned preferred operating frequency of 5.5-Gigahertz. Various ones of the previously mentioned, prior-issued patents which have been incorporated herein by reference may be consulted conveniently to offer further detailed descriptions of these various components of each transmitter/receiver unit.

When a transmitter/receiver unit is placed into operation in accordance with practice of the present invention, the driven transmission element is energized at the system operating frequency to direct microwave radiation toward the central axis of chamber 24. Reflected and returned microwave energy, resulting from an "engagement" with whoever and whatever is positioned within chamber 24, is received by receiving element RX.

Figure 8:
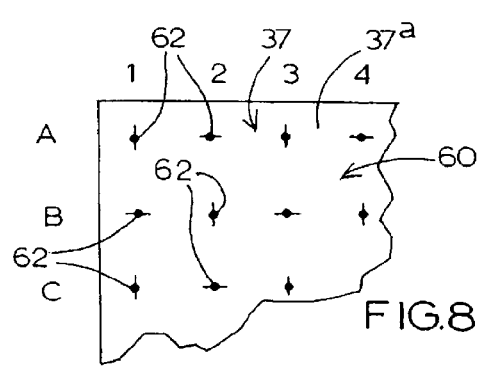
FIG. 8 describes a preferred pattern of, unified microwave energizing of transmitter/receiver structure (including plural, coaxial, transmitter/receiver units) included in the two "scanning" panels which are employed in accordance with this invention.

Turning attention now to FIG. 8 in the drawings, here a fragment of a tile 37 is illustrated, with eleven of the sixteen transmitter/receiver units that form part of this tile also pictured in FIG. 8. For the sake of convenience, and to keep FIG. 8 as uncluttered as possible, each transmitter/receiver unit is simply represented in FIG. 8 by an enlarged, blackened dot. As can be seen, the eleven dots which are pictured in FIG. 8 that represent eleven of the transmitter/receiver units in the pictured tile are deployed in a rectangular array of columns and rows, with four columns (1, 2, 3, 4) pictured and so labeled, and three rows (A, B, C) also pictured and so labeled.

One will observe, on looking at the representations presented in FIG. 8 for the eleven, illustrated transmitter/receiver units, that short straight vertical and horizontal lines have been drawn through the centers of the dots representing these units. Vertical lines are employed to indicate that the TX and RX elements in these units are oriented for polarization in a vertical plane. Similarly, the short horizontal lines reflect the fact that the TX and RX elements in these units are oriented for polarization in a horizontal plane. One can further see that as one progresses from left to right along a row of units 62, the polarizations of next-adjacent units alternate. The same kind of polarity alternation is true with respect to next-adjacent units 62 progressing downwardly though each column of units.

This orthogonal polarity relationship is an important feature in maximizing the likelihood that any anomaly of interest with respect to use of the system of this invention will be detected, no matter what its orientation might be in relation to the posture of a person standing in chamber 24.

During what can be thought of as a scanning sweep in accordance with practice of this invention, and namely a sweep which takes place under circumstances where panels 26, 28 are stationary relative to a person standing in chamber 24, the transmitter/receiver units in each of the three vertical arrays of tiles in panels 26, 28 are each appropriately and sequentially energized for an extremely short burst of time, namely, about 10-microseconds, in a pattern of energization which will now be described. Looking at FIG. 8 for an understanding of this energization description, with respect to the tile shown there, which, for the purpose of this explanation, will be treated as being the uppermost tile of the eight tiles in one of the three columns of tiles in a panel, the first fragmentary moment of energization results in the two vertically displaced units which occupy positions A1 and B1 in the array pictured in FIG. 8 being energized simultaneously. They thus eradiate definable (position wise) regions within chamber 24 with microwave energy which is orthogonally polarized in accordance with the polarization configurations previously discussed above.

In the next momentary burst of energization, the transmitter/receiver units which occupy positions A2 and B2 are energized. This pattern progresses across the upper two rows of the units in the tile pictured in FIG. 8 until all units 62 across the tile in rows A and B have been so energized in sequence. What next occurs is that the same sort of activity now takes place with respect to a downwardly-shifted, next-vertically-adjacent pair of units 62, and namely first of all with energization of the elements occupying positions B1 and C1 in FIG. 8. After this burst of energization, the pattern of energization sweeps laterally across rows B and C, and so on until all elements in all tiles in each of the three columns of tiles in the two panels have been in this manner sequentially energized. A complete sweep of energization through all of the elements with the pattern of energizing just described completes one phase of a scanning operation performed by the present invention.

As each pair of units 62 is so energized, any returned, reflected energy resulting from that energization is detected by the RX units in the associated transmitter/receiver units, and the levels of energy received are fed appropriately to previously mentioned computer 44 which compares the return energy levels with an appropriate pre-selected map, or pattern, of expected return levels for the purpose of assessing whether or not a non-physiologic anomaly has been detected.

As has been mentioned, stored within library 46, in accordance with this invention, are appropriate "tables" of return-level values that have been pre-assembled in accordance with dielectric physiologic norms that have been assessed from pre-use calibration of the system, and the build-up of tables based upon different sizes, weights, heights, etc. of different categories of people. While any number of such tables can clearly be selected for use, practical experimentation with the system of this invention has shown that somewhere in the neighborhood of sixty-two different categories of return-value tables will quite adequately produce good detection results.

Figure 3:
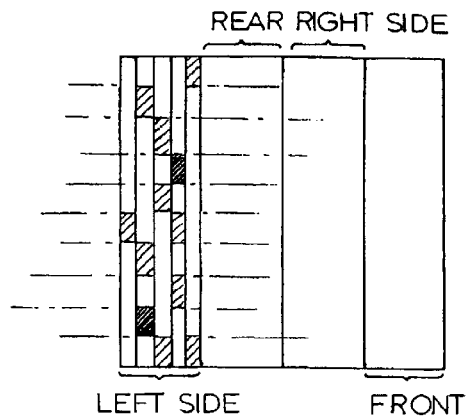
FIG. 3 is a simple, stylized diagram illustrating a map (grid-like or checkerboard-like in form), wherein light and dark areas are presented to represent detected dielectric characteristics of different regions of the four quadrants (front, rear, left side, right side) of a scanned human subject.

As was mentioned earlier, operation of the system of this invention produces no photographic picturing of a person whose body is being scanned. Rather, what may be presented either alternately or in combination, for example, are two different kinds of visual displays, one of which takes the form of a grid-like, or checkerboard-like, layout of different-brightness gray-scale patches, such as those generally illustrated in FIG. 3, which, for each of the four quadrants of the body, will generally illustrate any regions where anomalies have been found. Anomalies might be pictured, for example, by displays of regions which are either brighter or darker by an appreciable amount than their respective surrounding regions. To illustrate this point, two such stand-out regions are pictured as darkened regions on the left-side "grid information" presented in FIG. 3.

Figure 4:
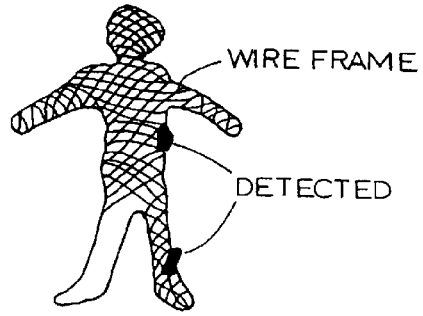
FIG. 4 is a simplified diagram of an anatomical wire form of the human body, with two darkened patches illustrated at locations on this form to indicate the presence of detected, physiologic, dielectric abnormalities regarding a particular subject.

FIG. 4 shows the other particularly useful kind of visual display which presents a generic wire-form anatomy illustration whereon regions of anomaly interest may similarly be highlighted or darkened, in a yes/no, "binary" fashion, to call attention to themselves. It will be appreciated that interpretation of information furnished by the display of FIG. 4 is less skilled-requiring than is information given by the display of FIG. 3

When a first scanning phase has been completed of the two, opposite, lateral sides of a person's body, the structure supporting panels 26, 28 quickly rotates these panels through a ninety-degree arc, and brings them to a stop, whereupon a second, "quadrature" scanning phase, which is effectively a repeat of the first-described scanning phase, takes place.

If an alarm state is generated on the basis of an anomaly having been detected, whoever is managing and operating the system of this invention can simply direct the person whose scan has produced an alarm to proceed to another region for more detailed scanning, such being, of course, for the purpose of trying to detect exactly what the "generally-found" non-physiologic anomaly is. At the completion of a complete scanning operation for a single person, and as was described earlier, panels 26, 28 will be oriented, relative to axis 34, with dispositions that are orthogonal relative to the dispositions which they held immediately prior to the last-completed full scan. Under these circumstances, and with a two-orthogonal line-arrangement organized for people awaiting to be scanned in accordance with the invention, the person at the head of the line which is orthogonally disposed relative to the line from which the last-scanned person came, enters the chamber, and the process now repeats itself with, of course, panels 26, 28, on completion of the next, first scanning phase, then counter-rotating back to the positions which they held at the beginning of the first described scanning operation.

As was mentioned earlier, while large-group anomaly scanning has been quite fully and particularly described herein, other important applications exist. One which has been mentioned involves scan-identifying people to control permitted access to business-sensitive areas in a company. For such an application, dielectric physiologic signatures may be created for such authorized-access people, including various person-specific signatures for each person to reflect expected, normal signature changes that might be related, for example, to ambient temperature, humidity, and to other normal physiology-affecting factors.

Still other applications will become apparent to those generally skilled in the art, an all variations and modifications of the invention, suitable to address these various applications, are contemplated to be within the proper scope of the present invention.

I claim:

1. A dielectric method for scanning a human subject comprising providing an interrogation region within which the subject is stationed during scanning, for the purpose of acquiring scanning data, illuminating the subject within the interrogation region with microwave signal energy, and monitoring the dielectric response therefrom, utilizing an array of combined, co-axial transmitter/receiver antennae, and performing said illuminating in a condition without there being any relative lateral motion between the antennae array and the subject, comparing the dielectric response scanning data with baseline physiological response data stored in a memory to produce data representative of any difference therebetween, and evaluating such produced data by the use of defined scanning criteria.

2. The method of claim 1, wherein the illuminating step is performed in such a manner that transmitted microwave energy penetrates the body of a subject by a distance from the surface which is substantially 2.5-wavelengths of the illuminating signal frequency, as such wavelengths are determined in accordance with the nominal dielectric constant of the subject's physiology in the region where that illuminating takes place.

3. The method of claim 2, wherein the 2.5-wavelength penetration mentioned is such that the associated penetration crosses an internal boundary defined by physiology within the subject which has at least two, different material dielectric characteristics.

4. The method of claim 3, wherein the illuminating frequency is substantially 5.5-Gigaherz.

5. The method of claim 1, wherein the interrogation region is laterally defined by two, upright, spaced, confrontingly opposing arrays of dielectric devices, which arrays recurrently counter-rotate through a substantially ninety-degree angle during each successive subject-scanning procedure, with the space between the arrays generally defining two upright, spaced, confrontingly opposing open subject entrances to the region which lies between the arrays, and wherein successive subjects to be scanned are introduced to the interrogation region through these entrances from generally orthogonally related lines which extend from the interrogation region, with successively scanned subjects entering and exiting the interrogation region alternately from these two lines and along two right-angle paths whose corners lie in the space between the arrays.

6. A dielectric system for scanning a human subject comprising an interrogation region within which a subject is stationed during scanning, dielectric structure disposed in a non-lateral relative-motion condition with respect to such a subject for illuminating the subject within said interrogation region with microwave energy thus to acquire scanning data, and to monitor the dielectric response scanning data therefrom, said dielectric structure including, at least in part, an array of combined, coaxial transmitter/receiver antennae, comparison structure operatively connected to said transmitter/receiver antennae operable to compare the dielectric response scanning data with baseline physiological response data stored in a memory, and to produce data which is representative of any difference therebetween, and evaluation structure operatively connected to said comparison structure for evaluating such produced data by the use of defined scanning criteria.

7. The system of claim 6, wherein said transmission/reception antennae have respective operational polarities, and are arranged in arrays in a substantially orthogonal, row-and-column manner, and wherein next-adjacent antennae have operational polarities which is generally orthogonal relative to that one another.

8. A microwave system for the two-position, non-relative-motion scanning of the physiology of a human subject to detect defined dielectric abnormalities therein comprising a pair of spaced, confronting, upright panels carrying microwave transmitter/receiver structure and collectively defining (a) opposite sides of an upright screening zone which has an upright generally central elongate axis, and (b) a panel-orientation-determined path for the transit of a subject to be scanned into and out of said zone between said panels, structure mounting said panels for cyclic, quadrature counter-rotation as a unit about said axis, back and forth between two, stationary, generally orthogonally related screening positions, each screening of a human subject involving a single quadrature rotation of the panel from one to the other of said two positions, with each such screening thus creating an orthogonal, overall transit path for a subject entering and then later leaving said zone, with the paths for two successive screened subjects having an orthogonal relationship relative to one another, and microwave energizing and detecting structures operatively connected to said panels, and operable under circumstances with the panels stationed at rest in each of said two positions to operate the transmitter/receiver structure therein.

* * * * *